United States Patent [19]
Huang

[11] Patent Number: 5,560,086
[45] Date of Patent: Oct. 1, 1996

[54] STRAPPING MECHANISM HAVING A SAFETY DEVICE

[76] Inventor: Han-Ching Huang, No. 12 Avenue 111, Lane 437, Jeng Hsin Road, Taichung, Taiwan

[21] Appl. No.: 418,590

[22] Filed: Apr. 6, 1995

Related U.S. Application Data

[63] Continuation-in-part of Ser. No. 212,358, Mar. 14, 1994, abandoned.

[51] Int. Cl.$^6$ ................................................ B25B 25/00
[52] U.S. Cl. ............................................... 24/68 CD
[58] Field of Search ........................... 24/68 R, 68 CD, 24/68 SB, 68 BT, 68 SK, 68 B, 68 D; 254/218

[56] References Cited

U.S. PATENT DOCUMENTS 3,175,806  3/1965  Prete, Jr. .................. 24/68 CD
4,199,182  4/1980  Sunesson .................. 24/68 CD

*Primary Examiner*—James R. Brittain
*Attorney, Agent, or Firm*—Charles E. Baxley, Esq.

[57] ABSTRACT

A strapping mechanism includes an operating arm and a base arm pivotally coupled together at a shaft. A stop and a catch are slidably engaged in the base arm and the operating arm, and a pair of ratchet gears are secured on the shaft. The base arm includes two rings each having a bulge and includes a pair of hooks. The operating arm has a pair of flanges and a pair of projections for engaging with the stop so as to prevent the stop from disengaging from the ratchet gears. The catch is moved over the bulges to engage the flanges with the hooks when the operating arm is rotated toward the base arm.

1 Claim, 2 Drawing Sheets

STRAPPING MECHANISM HAVING A SAFETY DEVICE

The present invention is a continuation-in-part of U.S. patent application Ser. No. 08/212,358, filed Mar. 14, 1994, now abandoned.

BACKGROUND OF THE INVENTION

1. Field of the Invention

The present invention relates to a strapping mechanism, and more particularly to a strapping mechanism having a safety device.

2. Description of the Prior Art

A typical strapping mechanism is disclosed in U.S. Pat. No. 4,199,982 to Sunesson, issued on Apr. 22, 1980. The strapping mechanism comprises an operating arm rotatable relative to another arm, and a special safety catch is provided for preventing the operating arm for rotating relative to the another arm. However, the operating arm can not be stably secured to the another arm and may also be rotated relative to the another arm inadvertently.

Another typical strapping mechanism is disclosed in U.S. Pat. No. 3,175,806 to Prete, Jr., filed on Nov. 4, 1963. In Prete, Jr., a handle is provided for moving a driving pawl so as to engage the driving pawl with hook means and so as to secure two operating arms together in order to prevent the operating arms from disengaging from each other and in order to prevent the wound cable from loosening. However, the handle should be operated by the users in order that the driving pawl may be engaged with the hook means. This is inconvenient when the users are both hands busy for holding objects and have no hands for operating the handles.

The present invention has arisen to mitigate and/or obviate the afore-described disadvantages of the conventional strapping mechanisms.

SUMMARY OF THE INVENTION

The primary objective of the present invention is to provide a strapping mechanism which includes a catch that may easily and automatically engage with two securing hooks in order to prevent the operating arms from disengaging from each other.

In accordance with one aspect of the invention, there is provided a strapping mechanism comprising an operating arm and a base arm pivotally coupled together at a shaft, the shaft including an axis, the base arm including a first end having a pair of rings rotatably engaged on the shaft, the rings including a first radius and each including an upper portion having a curved cut portion formed therein so as to define a second radius, the second radius being smaller than the first radius, the rings each including a bulge abutting the base arm, the bulges each including a tip portion having a radius equals to the first radius and each including a root portion having a radius smaller than the first radius, the base arm including a pair of hooks extended upward therefrom, and the operating arm including a pair of projections extended therefrom, a pair of ratchet gears secured on the shaft and rotatable in an active direction and in a reverse direction, the ratchet gears including a radius equals to the first radius of the rings, a catch slidably engaged in the operating arm and including a pair of openings formed therein for engaging with the hooks of the base arm and including a pair of flanges partially overlapping the openings for engaging with the hooks so as to prevent the operating arm from rotating relative to the base arm, the catch including a pair of first legs for engaging with the ratchet gears and including a handgrip for moving the catch, means for biasing the first legs of the catch to engage with the ratchet gears so as to drive the ratchet gears in the active direction when the operating arm is rotated relative to the base arm, the handgrip of the catch being pulled against the biasing means for disengaging the catch from the ratchet gears, a stop slidably engaged in the base arm and including a pair of second legs for engaging with the ratchet gears, means for biasing the second legs of the stop to engage with the ratchet gears so as to prevent the ratchet gears from rotating in the reverse direction. The first legs of the catch are moved over the tip portions of the bulges to engage with the root portions of the bulges so as to engage the flanges with the hooks when the operating arm is rotated toward the base arm. The flanges are engaged with the hooks without operating the hand grip. The projections of the operating arm are engaged with the stop so as to prevent the stop from being moved when the flanges are engaged with the hooks.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
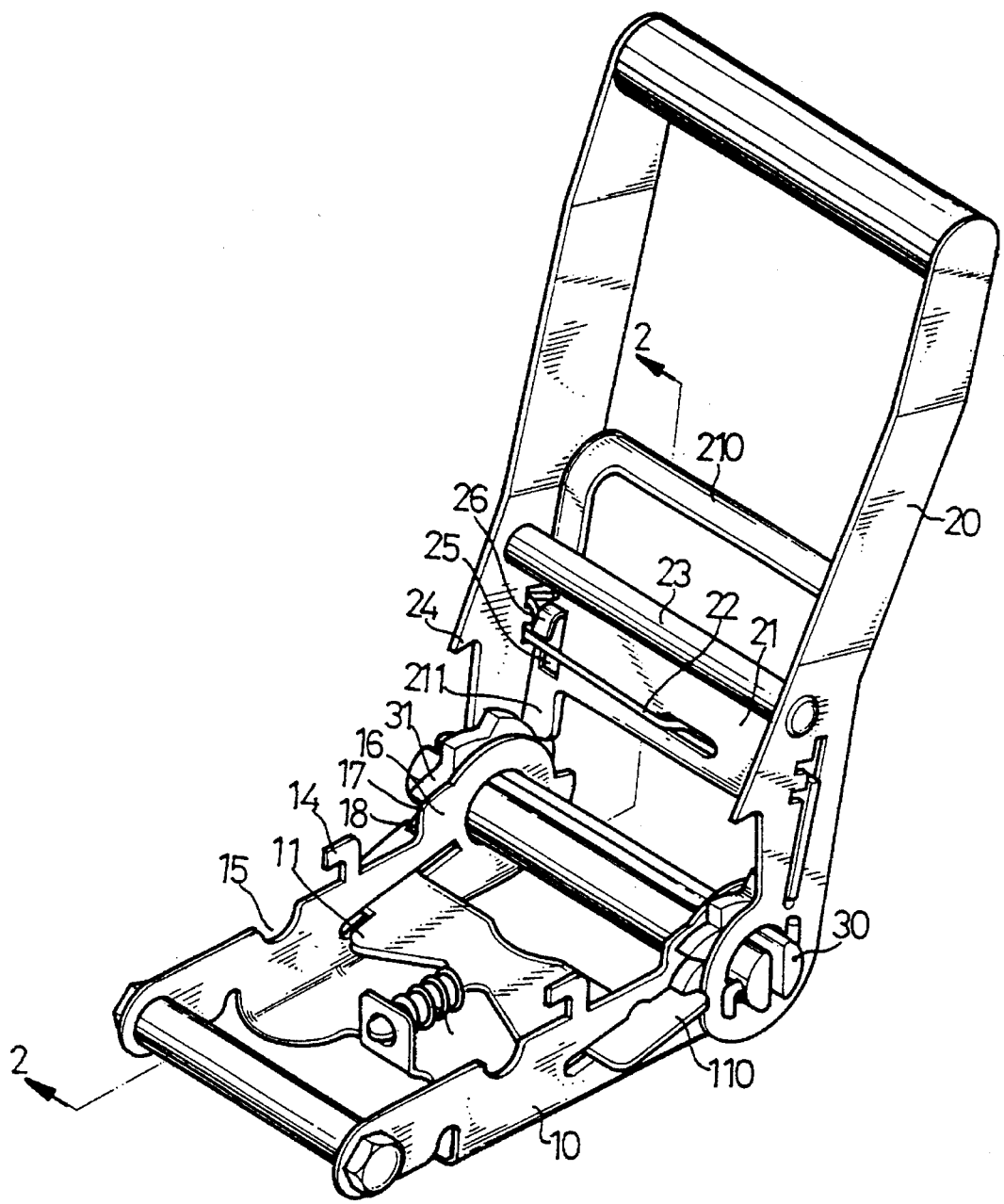
FIG. 1 is a perspective view of a strapping mechanism in accordance with the present invention.
Figure 2:
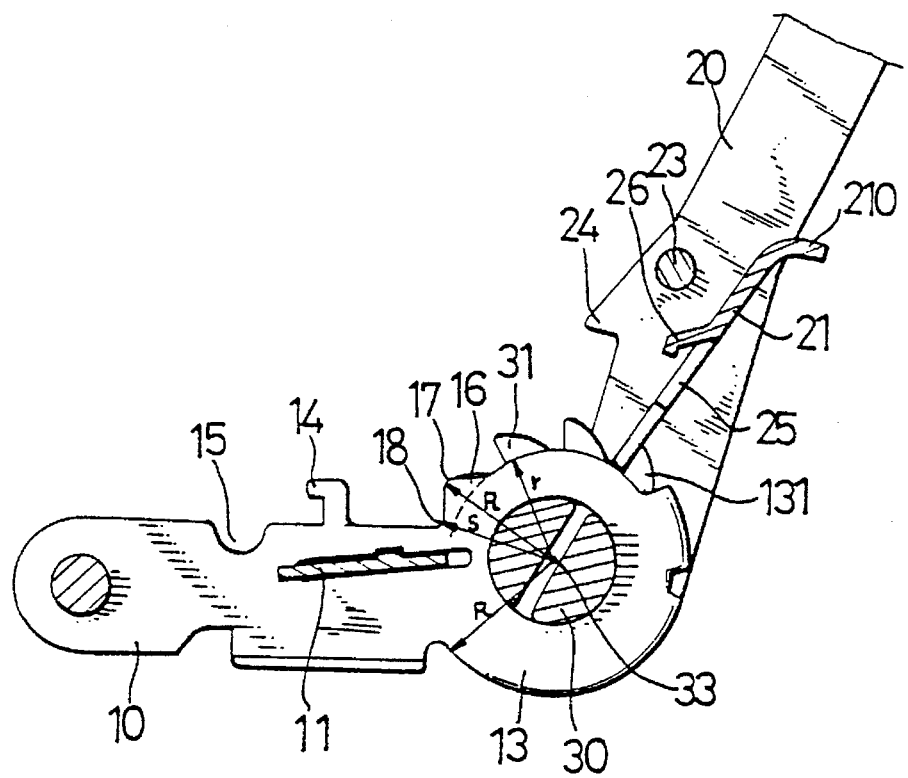

Referring to the drawings, and initially to FIGS. 1 and 2, a strapping mechanism in accordance with the present invention comprises a base arm 10 and an operating arm 20 pivotally coupled together at a shaft 30. A pair of ratchet gears 31 are secured on the end portions of the shaft 30 and rotatable in an active direction and a reverse direction. The base arm 10 includes a stop 11 slidably engaged therein and having a pair of legs 110 for engaging with the ratchet gears 31. A spring 12 is biased between the base arm 10 and the stop 11 for biasing the legs 110 of the stop 11 toward the ratchet gears 31 to engage with the ratchet gears 31 so as to limit the rotational direction of the ratchet gears 31 and so as to prevent the ratchet gears 31 from rotating in the reverse direction. The base arm 10 includes a pair of hooks 14 extended upward from the middle portion thereof close to the stop 11, and includes a pair of recesses 15 formed in the middle portion thereof. A cable is to be wound around the shaft 30 when the operating 30 is rotated relative to the base arm 10 repeatedly in a reciprocating action.

The operating arm 20 includes a catch 21 slidably engaged therein and having a pair of legs 211 for engaging with the ratchet gears 31 and having a hand grip 210 for operating the catch 21. A spring 22 is biased between the operating arm 20 and the catch 21 for biasing the legs 211 of the catch 21 to engage with the ratchet gears 31 in order to drive the ratchet gears 31 in the active direction and so as to prevent the ratchet gears 31 from rotating in the reverse direction. The operating arm 20 includes a pair of beams coupled together by a reinforcing rod 23 which may be engaged with the recesses 15 when the operating arm 20 rotates to engage with the base arm 10, best shown in FIG.

3. The operating arm 20 includes a pair of projections 24 for engaging with the stop 11 when the operating arm 20 are rotated toward the base arm 10 so as to prevent the stop 11 from being moved and so as to prevent the legs 110 of the stop 11 from disengaging from the ratchet gears 31. The operating arm 20 includes a pair of openings 25 for engaging with the hooks 14 and includes a pair of flanges 26 partially overlapping the openings 25 respectively for engaging with the hooks 14 so as to prevent the operating arm 20 from rotating relative to the base arm 10. The flanges 26 are punched from the catch 21 so as to form the openings 25.

Referring next to FIG. 3, and again to FIG. 2, the base arm 10 includes a pair of rings 13 having an axis 33 coinciding with the axis of the ratchet gears 31 and the axis of the shaft 30. The rings 13 include an outer diameter R no less than that of the ratchet gears 31 for covering the ratchet gears 31 and each includes an upper portion having a curved cut portion 131 so as to form the upper portion of shorter diameter r for exposing the teeth of the ratchet gear 31 such that the legs 110 of the stop 11 may engage with the ratchet gears 31. The rings 13 each includes a bulge 16 abutting the base arm 10. The bulge 16 each includes a tip portion 17 having a diameter R equals to that of the ring 13 and each includes root portion 18 having a diameter s less than R and no less than r.

Figure 3:
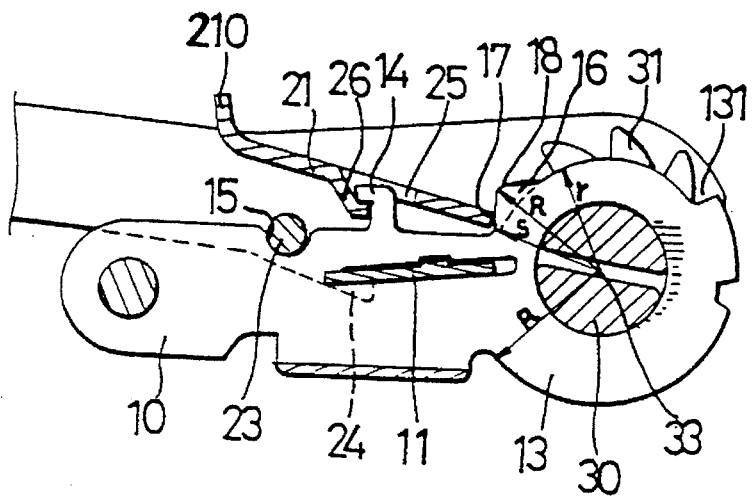
FIGS. 2 and 3 are cross sectional views taken along lines 2—2 of FIG. 1, illustrating the operation of the strapping mechanism.

In operation, as shown in FIG. 3, when the operating arm 20 is rotated toward the base arm 10, the legs 211 of the catch 21 may automatically engage over the tip portion 17 and may engage with the root portion 18 for engaging the flanges 26 of the catch 21 with the hooks 14, without operating the hand grip 210 of the catch 21. The operating arm 20 is thus prevented from rotating relative to the base arm 10. At this moment, the projections 24 of the operating arm 20 are engaged with the stop 11 so as to prevent the stop 11 from being moved and so as to prevent the legs 110 of the stop 11 from disengaging from the ratchet gears 31. The cable wound on the shaft 30 thus may not be unwound and may be stably retained in place.

Accordingly, the strapping mechanism in accordance with the present invention includes a double security safety device for preventing the operating arm 20 from rotating relative to the base arm 10. The cable may thus be stably retained in place without becoming loosening.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strapping mechanism comprising:

an operating arm and a base arm pivotally coupled together at a shaft, said base arm including a first end having a pair of rings rotatably engaged on said shaft, said rings including a first radius and each including an upper portion having a curved cut portion formed therein so as to define a second radius, said second radius being smaller than said first radius, said rings each including a bulge abutting said base arm, said bulges each including a tip portion having a radius equal to said first radius and each including a root portion having a radius smaller than said first radius, said base arm including a pair of hooks extended upward therefrom, and said operating arm including a pair of projections extended therefrom, a pair of ratchet gears secured on said shaft and rotatable in an active direction and in a reverse direction, said ratchet gears including a radius equal to said first radius of said rings, a catch slidably engaged in said operating arm and including a pair of openings formed therein for engaging with said hooks of said base arm and including a pair of flanges partially overlapping said openings for engaging with said hooks so as to prevent said operating arm from rotating relative to said base arm, said catch including a pair of first legs for engaging with said ratchet gears and including a handgrip for moving said catch, means for biasing said first legs of said catch to engage with said ratchet gears so as to drive said ratchet gears in said active direction when said operating arm is rotated relative to said base arm, said handgrip of said, catch being pulled against said biasing means for disengaging said catch from said ratchet gears, a stop slidably engaged in said base arm and including a pair of second legs for engaging with said ratchet gears, means for biasing said second legs of said stop to engage with said ratchet gears so as to prevent said ratchet gears from rotating in said reverse direction, said first legs of said catch being moved over said tip portions of said bulges to engage with said root portions of said bulges so as to engage said flanges with said hooks when said operating arm is rotated toward said base arm, said flanges being engaged with said hooks without operating said hand grip, and said projections of said operating arm being engaged with said stop so as to prevent said stop from being moved when said flanges are engaged with said hooks.

* * * * *